(12) United States Patent
Jack (10) Patent No.: US 12,060,786 B2
(45) Date of Patent: Aug. 13, 2024

(54) WELLBORE INSPECTION SYSTEM

(71) Applicant: Halliburton Energy Services, Inc., Houston, TX (US)

(72) Inventor: Graham P. Jack, Newburgh (GB)

(73) Assignee: Halliburton Energy Services, Inc., Houston, TX (US)

(*) Notice: Subject to any disclaimer, the term of this patent is extended or adjusted under 35 U.S.C. 154(b) by 289 days.

(21) Appl. No.: 16/954,697

(22) PCT Filed: Dec. 17, 2018

(86) PCT No.: PCT/US2018/066021
§ 371 (c)(1),
(2) Date: Jun. 17, 2020

(87) PCT Pub. No.: WO2019/156742
PCT Pub. Date: Aug. 15, 2019

(65) Prior Publication Data
US 2020/0362688 A1 Nov. 19, 2020

Related U.S. Application Data

(60) Provisional application No. 62/628,206, filed on Feb. 8, 2018.

(51) Int. Cl.
*E21B 47/00* (2012.01)
*E21B 47/005* (2012.01)
(Continued)

(52) U.S. Cl.
CPC ............ *E21B 47/005* (2020.05); *E21B 47/06* (2013.01); *G01V 1/50* (2013.01)

(58) Field of Classification Search
CPC ........ E21B 47/005; E21B 47/06; E21B 47/04; E21B 47/047; E21B 47/09; E21B 47/095; G01V 1/50; G01N 29/4436
(Continued)

(56) References Cited

U.S. PATENT DOCUMENTS 2,999,557 A * 9/1961 Smith ..................... E21B 33/16
367/27
6,053,245 A 4/2000 Haberman
(Continued)

FOREIGN PATENT DOCUMENTS

GB 2290811 A 1/1996
WO 2012156730 A2 11/2012
(Continued)

OTHER PUBLICATIONS

Supplementary European Search Report dated Feb. 24, 2021 for EP Application No. 18905453, filed Dec. 17, 2018.
(Continued)

*Primary Examiner* — James R Hulka
(74) *Attorney, Agent, or Firm* — K&L Gates LLP (57) ABSTRACT

A method for inspecting a wellbore. The method may include inducing a transient pressure pulse in the wellbore via a transient pressure pulse generator. The method may further include measuring a pressure trace of the transient pressure pulse using a pressure sensor proximate to the transient pressure pulse generator. The method may also include measuring a returned signature reflection of the transient pressure pulse using the pressure sensor. The method may further include comparing the pressure trace and the returned signature reflection to determine at least one of a type of flow barrier or a condition of the flow barrier.

20 Claims, 4 Drawing Sheets

(51) Int. Cl.
*E21B 47/06* (2012.01)
*G01V 1/50* (2006.01)

(58) Field of Classification Search
USPC .............. 166/253.1, 255.1, 250.03, 250.04
See application file for complete search history.

(56) References Cited

U.S. PATENT DOCUMENTS

| | | | |
|---|---|---|---|
| 6,401,814 B1 | 6/2002 | Owens et al. | |
| 6,993,963 B1 | 2/2006 | Gudmundsson | |
| 7,318,471 B2 * | 1/2008 | Rodney | E21B 47/095 |
| | | | 166/177.2 |
| 7,373,976 B2 * | 5/2008 | Casey | E21B 47/18 |
| | | | 166/250.03 |
| 8,235,143 B2 * | 8/2012 | Tseytlin | E21B 47/107 |
| | | | 175/48 |
| 9,347,309 B2 * | 5/2016 | Raducanu | E21B 33/16 |
| 9,841,523 B2 * | 12/2017 | Shampine | E21B 47/005 |
| 9,933,293 B2 * | 4/2018 | Earl | G01F 23/14 |
| 10,156,653 B2 * | 12/2018 | Lemarenko | G01V 1/36 |
| 2005/0284625 A1 * | 12/2005 | Rodney | E21B 47/095 |
| | | | 166/177.2 |
| 2006/0102346 A1 | 5/2006 | Casey | |
| 2012/0006613 A1 | 1/2012 | Tseytlin | |
| 2017/0059388 A1 | 3/2017 | Earl | |
| 2017/0176622 A1 | 6/2017 | Lemarenko | |
| 2017/0342823 A1 | 11/2017 | Shah | |

FOREIGN PATENT DOCUMENTS

| | | |
|---|---|---|
| WO | 2016099288 A1 | 6/2016 |
| WO | 2017083444 A1 | 5/2017 |

OTHER PUBLICATIONS

International Search Report and Written Opinion dated Apr. 5, 2019 for PCT Application No. PCT/US2018/066021 filed Dec. 17, 2018, pp. 11.

* cited by examiner

WELLBORE INSPECTION SYSTEM

BACKGROUND

This section is intended to provide relevant background information to facilitate a better understanding of the various aspects of the described embodiments. Accordingly, it should be understood that these statements are to be read in this light and not as admissions of prior art.

Wellbores for the extraction of hydrocarbons and other underground resources have been increasing in complexity for many years. New techniques for extraction of the resources involve using multiple tools, fluids, plugs, tubing strings, and other additions to the wellbore to increase productivity. With the increase in complexity, the importance of information concerning the downhole state of the wellbore also increases. Changing well conditions, however, mean that a single measurement of wellbore characteristics will not remain relevant for the life of the wellbore. Fluid flowlines, such as hydrocarbon production tubing, water lines, or pipelines, may experience a number of flow barriers due to the types of fluids, or the tools placed in the flowline. A stuck valve, a wax buildup, or other flow barrier may decrease productivity without giving a clear indication of the location or extent of the problem to operators at the surface. Additionally, the wellbore may be purposefully blocked as part of abandonment procedures that occur after the well is no longer economical to service.

The flow barriers within the wellbore may be inspected with logging runs by wireline, slickline, or tubing, but these methods can be time consuming and costly. The equipment used to conduct the runs is costly to rent, and the wellbore cannot produce any production fluid while the logging run is occurring. The costs associated with these techniques have led to permanent installation of gauges that monitor pressure, temperature, or other conditions that may enable operators to locate a flow barrier or determine the extent from a single location. Unless several permanent gauges are installed throughout the wellbore, however, a full picture of the wellbore condition will not be available.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides a wellbore inspection system that is able to determine the location and stability of a downhole flow barrier with a high degree of accuracy.

A main wellbore may in some instances be formed in a substantially vertical orientation relative to a surface of the well, and a lateral wellbore may in some instances be formed in a substantially horizontal orientation relative to the surface of the well. However, reference herein to either the main wellbore or the lateral wellbore is not meant to imply any particular orientation, and the orientation of each of these wellbores may include portions that are vertical, non-vertical, horizontal or non-horizontal. Further, the term "uphole" refers a direction that is towards the surface of the well, while the term "downhole" refers a direction that is away from the surface of the well.

Figure 1:
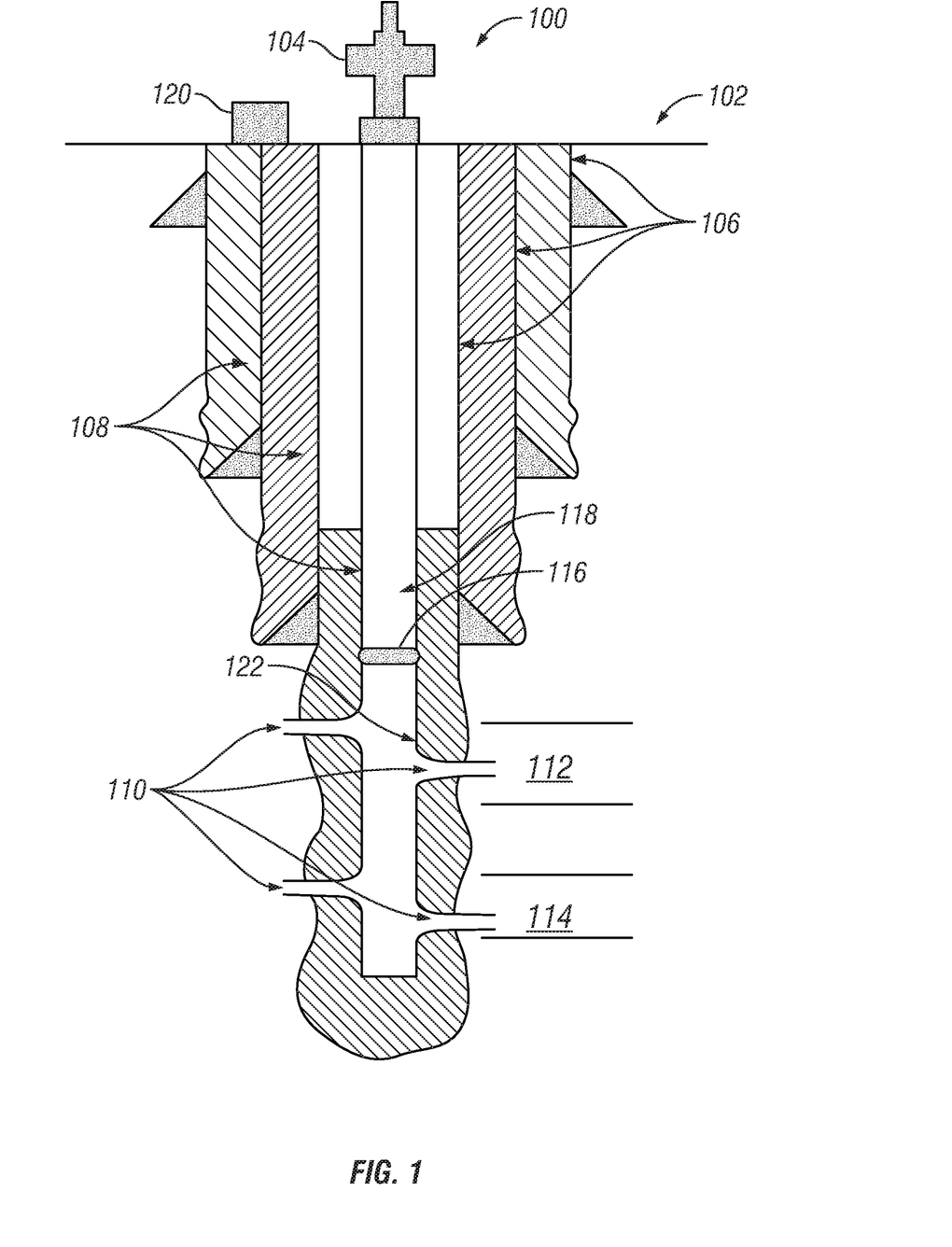
FIG. 1 is a schematic diagram of a well system, according to one or more embodiments.

FIG. 1 is a schematic diagram that depicts a well system 100, according to one or more embodiments. The well system 100 may include components located beneath the surface 102 in a wellbore 118 of a land-based operation. In certain embodiments, the well system 100 may be located off-shore, with rig structures extending up from the sea floor. The well system 100 may include a high-pressure wellhead housing, or "wellhead" 104 located above downhole components (not drawn to scale) that are installed over several stages of completion. For example, the illustrated embodiment of the well system 100 includes three layers of casing 106 that are secured in place by cement 108.

The wellhead 104 is connected to production tubing 122 that extends down to production zones 112, 114. The production tubing 122 may include perforations 110 that enable the production fluid to flow into the production tubing and up to the surface 102. The production tubing may include a flow barrier 116 that cuts off or restricts the flow of fluid from the production zones 112, 114 to the surface 102. The flow barrier 116 may be purposefully placed within the wellbore 118 (e.g., a plug, packer, bridge plug, cement plug, or cement used to retain the casing) as part of completion of the wellbore 118, treatment of the wellbore 118, or plug and abandon procedures. The flow barrier 116 may also be a buildup or obstruction within the wellbore 118, a downhole tool, such as a valve, or an interface between different fluids. For example, the interface between different fluids may be liquid/liquid interface between two different liquids within the wellbore 118, a liquid/gas interface, such as a gas pocket, within the wellbore 118.

The well system 100 also includes a wellbore inspection system 120 for determining location of and/or stability information about the flow barrier 116. The wellbore inspection system 118 includes a valve (not shown) located within the wellhead 104 and a pressure sensor (not shown) located immediately upstream or downstream of the valve to allow for accurate measurement of a pressure trace of a transient pressure pulse generated by a valve located within the wellhead 104 and the returned signature reflection of the transient pressure pulse as it is reflected off of the flow barrier 116 or the bottom of the wellbore 118. Whether the transient pressure pulse is reflected off of the flow barrier 116 or the bottom of the wellbore 118 depends on the type of flow barrier 116 within the wellbore 118. A fluid interface, such as a liquid/liquid interface or a liquid/gas interface, a buildup, or a partial obstruction alters the wavelength and/or amplitude of the transient pressure pulse, but otherwise allows the transient pressure pulse to pass through. A packer, plug, isolation device, or cement will reflect the transient pressure pulse, in addition to altering the wavelength and/or amplitude of the transient pressure pulse, preventing the transient pressure pulse from travelling further downhole. It should be appreciated that the transient pressure pulse may alternatively be generated using a variety of components. As a non-limiting example, the transient pressure pulse may also be generated by turning off a pump that is connected to the wellhead 104 and/or wellbore 118 or closing a valve located within the wellbore 118.

In some embodiments, the wellbore inspection system 120 may utilize an acoustic pulse generated by an acoustic source (not shown) instead of a transient pressure pulse. In such embodiments, an acoustic sensor (not shown) would replace the pressure sensor and would measure an acoustic trace when the acoustic pulse is generated and measure the return signature reflection of acoustic pulse as it is reflected off of the flow barrier 116 or the bottom of the wellbore 118. Similar to the transient pressure pulse generator and the pressure sensor, the acoustic source and the acoustic sensor may be located on the surface 102 or within the wellbore 118 and the acoustic sensor is located immediately upstream or downstream of the acoustic source.

Although FIG. 1 depicts a well system 100 that producing oil and/or gas, the present disclosure is not thereby limited. The wellbore inspection system 120 may also be used to determine the stability and/or condition of cement used in cementing operations to secure casing 106 within the wellbore 118. Additionally, the wellbore inspection system 120 may be used to determine the stability of an isolation device, such as a frac plug, used during fracturing or injection operations that occur prior to production or the wellbore inspection system 120 may be used during any other downhole operations that require detection and/or monitoring of a flow barrier 116.

Figure 2:
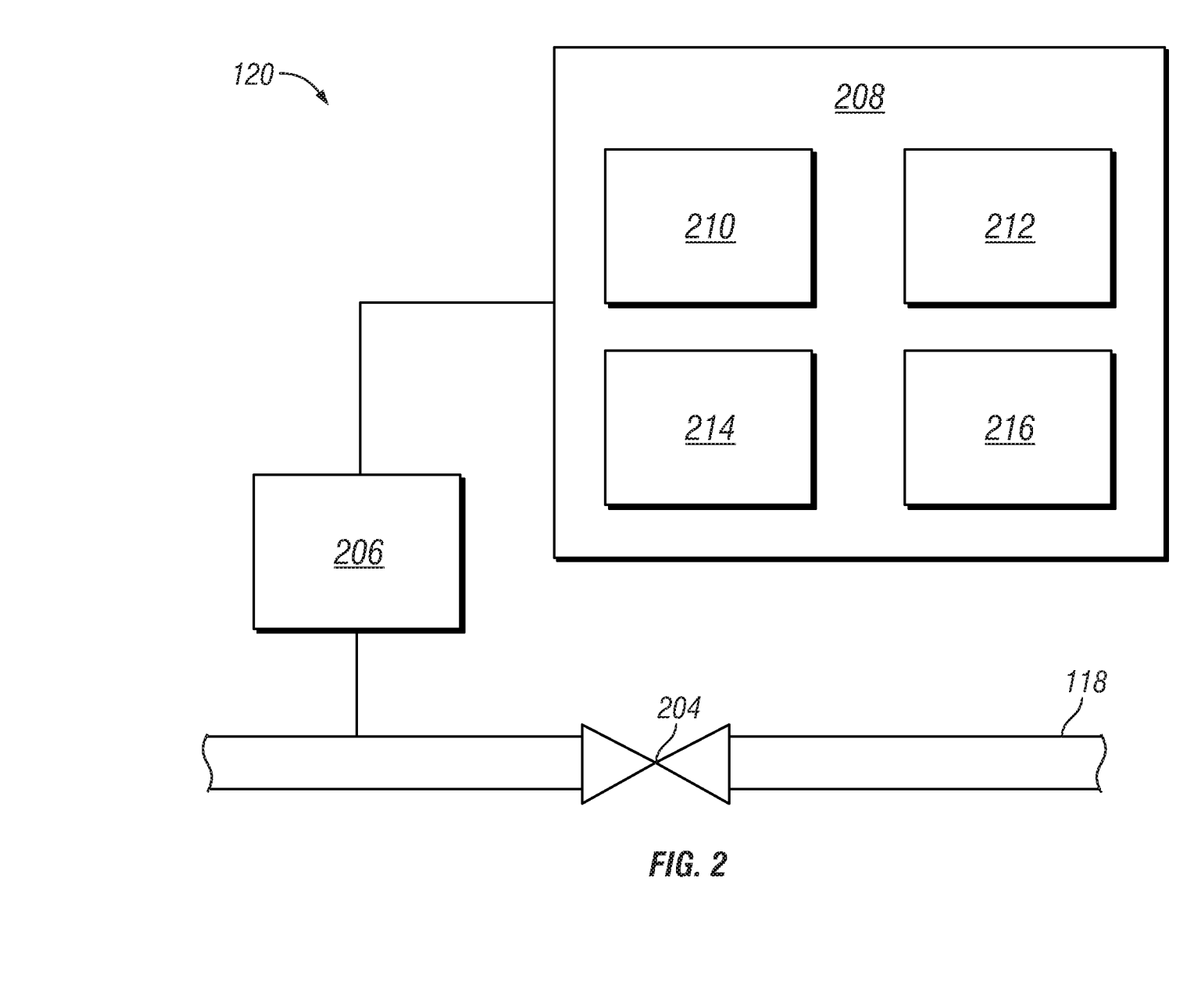
FIG. 2 is a schematic diagram of the wellbore inspection system of FIG. 1.

FIG. 2 is a schematic diagram that depicts the wellbore inspection system 120 of FIG. 1. A valve 204 in fluid communication with the wellbore 118 is closed to generate a transient pressure pulse in the wellbore 118. As it closes, the valve 204 interrupts any fluid flow that had been occurring through the valve 204, causing a transient pressure pulse to propagate down through the wellbore 118. As previously discussed, a pressure sensor 206, which may include a pressure gauge or transducer, is located immediately upstream or downstream from the valve 204. The pressure sensor 206 measures the pressure trace of the transient pressure pulse when the transient pressure pulse is generated and measures the returned signature reflection of the transient pressure pulse as it is reflected off of the flow barrier 116 or the bottom of the wellbore 118.

The pressure sensor 206 sends the pressure trace measurement and the returned signature reflection measurement to a computer system 208 that is in electronic communication with the pressure sensor 206. The computer system 208 may include one or more processors 210 and memory 212 (e.g., ROM, EPROM, EEPROM, flash memory, RAM, a hard drive, a solid state disk, an optical disk, or a combination thereof) capable of executing instructions. Software stored on the memory 212 governs the operation of the computer system 208. A user interacts with the computer system 208 and the software via one or more input devices 214 (e.g., a mouse, touchpad, or keyboard) and one or more output devices 216 (e.g., a screen or tablet). In at least one embodiment, the computer system 208, with the exception of the input device and output device, is located near the pressure sensor 206 and the computer system 208 is in electronic communication with a remove input device (not shown) and a remote output device (not shown). In another embodiment, the computer system 208 may omit the input device 214 and/or the output device and the computer system may be a part of or in electronic communication with a control system (not shown) used elsewhere in the well system 100.

Figure 3:
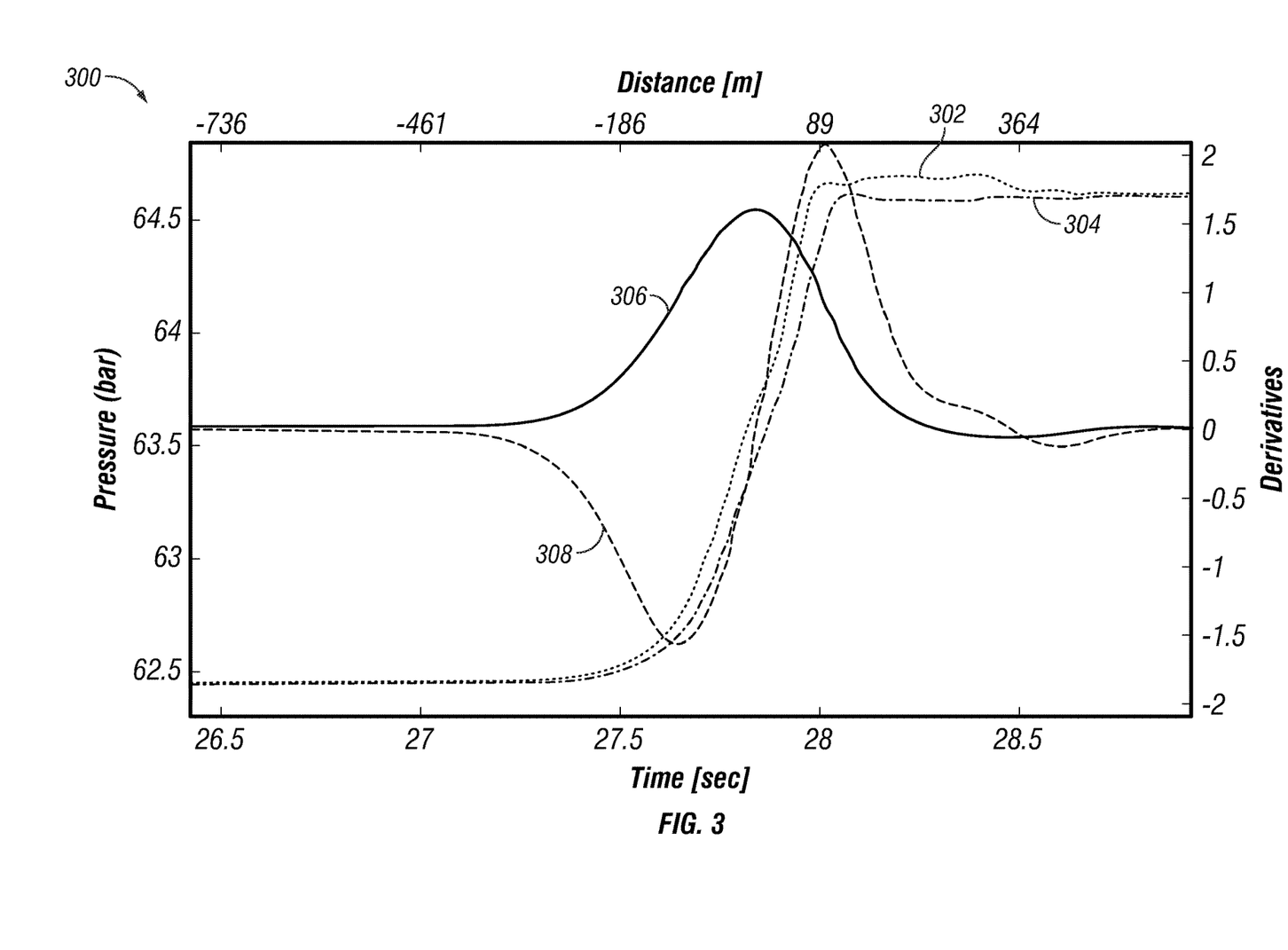
FIG. 3 is a graph of a waveform, according to one or more embodiments.

As shown in FIG. 3, the computer system 208 receives the pressure measurements from the pressure sensor 206 and generates a waveform graph 300 based on the pressure measurements. The computer system 208 compares the actual waveform 302 based on the measurements taken by the pressure sensor 206 as the valve 204 closes to an expected waveform 304 that was previously generated under controlled conditions to determine if a transient pressure pulse was successfully induced by the valve 204. A first derivative 306 of the actual waveform 302 is calculated to determine the rate of change of pressure within the wellbore 118 as the transient pressure pulse is generated. The rate of change of pressure is used to determine when the pressure pulse reached the speed of sound of the fluid within the wellbore 118, which is the speed at which a pressure pulse travels through the wellbore 118. A second derivative 308 of the actual waveform 304 is calculated to determine the amplitude and the frequency of the transient pressure pulse induced by the valve 204.

Figure 4:
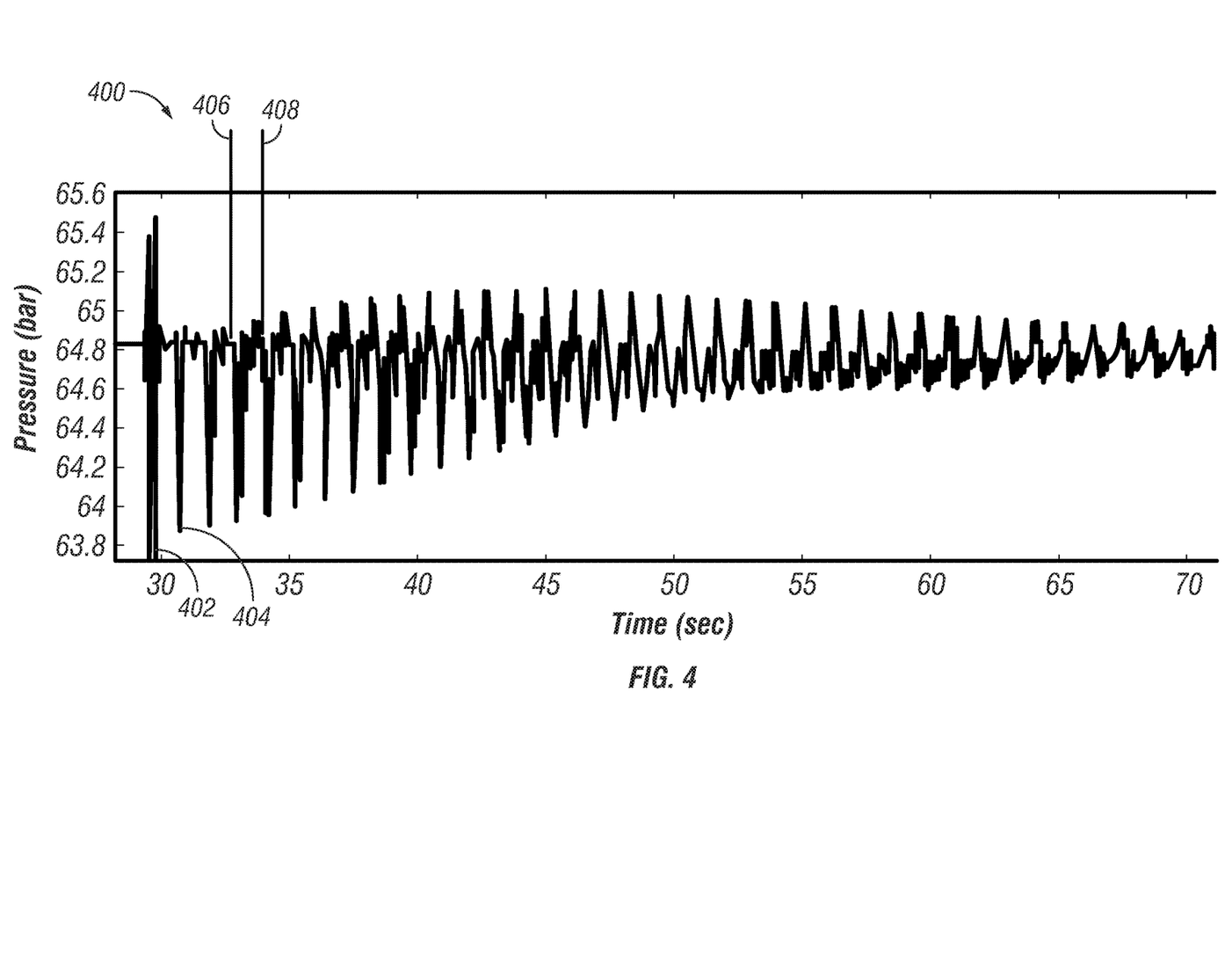
FIG. 4 is a graph of a pressure profile.

As shown in FIG. 4, in addition to generating the waveform graph 300, the computer system 208 generates a pressure profile 400. The pressure profile 400 has been filtered to remove frequencies that are outside of a range that is based on the frequency determined by the second derivative 308. The pressure profile 400 illustrates the reciprocal nature of the transient pressure pulse as it bounces between the flow barrier 116 or bottom of the wellbore 118, and the valve 204 that generated the transient pressure pulse. Since the transient pressure pulse travels at a known speed, the speed of sound of the fluid within the wellbore, the time between the pressure trace 402 of the transient pressure pulse and the first returned signature reflection 404 of the transient pressure pulse, or the time between consecutive return signature reflections 406, 408 can be used to determine the depth of the flow barrier 116 within the wellbore 118.

The transient pressure pulse can also be used to determine the condition, and/or type of flow barrier 116 within the wellbore. As the transient pressure pulse travels through the wellbore 118, the transient pressure pulse attenuates over time, losing energy, reducing in amplitude, and increasing in wavelength. The computer system 208 calculates the energy losses and changes in amplitude and wavelength due to known factors including, but not limited to, friction within the wellbore 118, including both friction due to the casing 108 and friction due to the wall of the formation. As a non-limiting example, friction may be calculated using a modified Hooke's Law formula enhanced and validated with extrinsic data. For a hydrodynamic pulse, restrained velocity theory for transient flow in an annular path has indicated that:

$$C_{system} = C_{fluid} \sqrt{\frac{1}{1 + \frac{ID}{WT} * \frac{K}{E}}}$$

where characteristics of the wellbore are input into the equation to give an expected modification to the pressure profile 400. Energy losses and changes in amplitude and wavelength may also be caused by temperature changes within the wellbore 118, changes in the internal diameter of the wellbore 118, and equipment that was previously installed within the wellbore 118. Once the energy losses, changes in amplitude, and changes in wavelength due to known factors have been calculated, the computer system 208 can determine the energy loss and changes in amplitude and wavelength of the transient pressure pulse due to the flow barrier 116 by comparing the pressure trace 402 of the transient pressure pulse to one or more returned signature reflections 404 of the transient pressure pulse.

Once the changes in amplitude and/or wavelength of the transient pressure pulse due to the flow barrier 116 are known, the computer system 208 determines the condition, and/or type of flow barrier 116 within the wellbore. The computer system 208 compares the measured changes in amplitude and/or wavelength to known changes due to different types of flow barriers 116 and is able to determine type of flow barrier 116, such as a liquid/liquid interface or a liquid/gas interface. The computer system 208 may also determine that multiple flow barriers 116 are present within the wellbore based on the comparison between the pressure trace 402 of the transient pressure pulse and the returned signature reflection(s) 404 of the transient pressure pulse.

If the flow barrier 116 within the wellbore 118 is known, the computer system 208 can determine the condition of the flow barrier 116. As a non-limiting example, the wellbore inspection system 120 may be used to determine if cement or another cured fluidic plugging material, such as a gel, a resin, rubber, plastic, glass, or metals, is set within the wellbore 118. The transient pressure pulse is generated by a valve 204, travels downhole, and is reflected by the cement. The computer system 208 compares the actual measurements of the returned signature reflection 404 of the transient pressure pulse to a known returned signature reflection of a transient pressure pulse reflecting off of set cement. If the cement within the wellbore 118 is set, the measurements will be similar. However if the cement is not set, more of the energy of the transient pressure pulse is absorbed by the cement, increasing the wavelength and/or reducing the amplitude of the transient pressure pulse.

The wellbore inspection system may also be used to determine the stability of a flow barrier 116. When determining the stability of the flow barrier 116, a first transient pressure pulse is generated to create a baseline pressure profile 400. Once the transient pressure pulse and returned signature reflection attenuate, a second transient pressure pulse is generated to create a second pressure profile 400. If the flow barrier 116 is stable within the wellbore 118, the position of the flow barrier 116 will not have changed and the flow barrier 116 will not absorb additional energy from the transient pressure pulse, resulting in the second pressure profile 400 being substantially similar to the baseline pressure profile 400. However, if the flow barrier 116 is not stable, the transient pressure pulse will cause movement of the flow barrier 116 further downhole and the flow barrier 116 may absorb additional energy from the transient pressure pulse, resulting in a second pressure profile that is different than the baseline pressure profile. Either or both of the transient pressure pulses may also be used to determine the location of the flow barrier 116 within the wellbore 118.

Certain embodiments of the disclosed invention may include a method for inspecting a wellbore. The method may include inducing a transient pressure pulse in the wellbore via a transient pressure pulse generator. The method may further include measuring a pressure trace of the transient pressure pulse using a pressure sensor proximate to the transient pressure pulse generator. The method may also include measuring a returned signature reflection of the transient pressure pulse using the pressure sensor. The method may further include comparing the pressure trace and the returned signature reflection to determine at least one of a type of flow barrier or a condition of the flow barrier.

In certain embodiments of the method, comparing the pressure trace and the returned signature reflection to determine at least one of the type of flow barrier or the condition of the flow barrier may also include determining a condition of a flow barrier comprising a cured fluidic plugging material.

In certain embodiments of the method, the flow barrier comprises cement and determining a condition of a flow barrier may also include a cured fluidic plugging material comprises determining if the cement has cured.

In certain embodiments of the method, comparing the pressure trace and the returned signature reflection to determine at least one of a type of flow barrier or a condition of the flow barrier may also include determining if the flow barrier is a liquid/liquid interface or a liquid/gas interface.

In certain embodiments of the method, determining if the flow barrier is a liquid/liquid interface or a liquid/gas interface may also include determining if the flow barrier comprises more than one liquid/liquid interface or liquid/gas interface.

In certain embodiments of the method, the method may also include comparing the pressure trace and the returned signature reflection to determine a depth of the flow barrier.

In certain embodiments of the method, the method may also include positioning the transient pressure pulse generator within the wellbore.

In certain embodiments of the method, the method may also include positioning the transient pressure pulse generator at the surface.

Certain embodiments of the disclosed invention may include a method for inspecting a wellbore. The method may include inducing a first transient pressure pulse in the wellbore via a transient pressure pulse generator. The method may also include measuring a pressure trace of the first transient pressure pulse using a pressure sensor proximate to the transient pressure pulse generator. The method may further include measuring a returned signature reflection of the first transient pressure pulse using the pressure sensor. The method may also include inducing a second transient pressure pulse in the wellbore via the transient pressure pulse generator. The method may further include measuring a pressure trace of the second transient pressure pulse using the pressure sensor. The method may also include measuring a returned signature reflection of the second transient pressure pulse using the pressure sensor. The method may further include comparing the pressure traces of the first and second transient pressure pulses and the returned signature reflections of the first and second transient pressure pulses to determine a stability of an isolation device.

In certain embodiments of the method, the isolation device may be selectively adjustable between an open position and a closed position and the method may further include comparing at least one of the first pressure trace or the second pressure trace and the respective returned signature reflection to determine the position of the isolation device.

In certain embodiments of the method, the method may also include comparing at least one of the first pressure trace or the second pressure trace and the respective returned signature reflection to determine a depth of the isolation device.

In certain embodiments of the method, the method may also include positioning the transient pressure pulse generator within the wellbore.

In certain embodiments of the method, the method may also include positioning the transient pressure pulse generator at the surface.

Certain embodiments of the disclosed invention may include a system for inspecting a wellbore. The system may include a transient pressure pulse generator, a pressure sensor, and a computer system. The transient pressure pulse generator may be configured to generate transient pressure pulses in the wellbore. The pressure sensor may be proximate to the transient pressure pulse generator and configured to measure the transient pressure pulses and returned signature reflections of the transient pressure pulses. The computer system may be in electronic communication with the pressure sensor and configured to analyze the transient pressure pulses and the returned signature reflections to determine at least one of a type of the flow barrier, a condition of the flow barrier, or a stability of the flow barrier.

In certain embodiments of the system, the transient pressure pulse generator may be positioned within the wellbore.

In certain embodiments of the system, the transient pressure pulse generator is positioned at the surface.

In certain embodiments of the system, the flow barrier may include at least one of a plug or a packer.

In certain embodiments of the system, the flow barrier may include a cured fluidic plugging material.

In certain embodiments of the system, the flow barrier may include at least one of a liquid/liquid interface or a liquid/gas interface.

In certain embodiments of the system, the computer system may be further configured to determine a depth of the flow barrier.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for inspecting a wellbore, the method comprising:
   inducing, by a valve, a transient hydrodynamic pressure pulse in the wellbore;
   measuring a pressure trace of the transient hydrodynamic pressure pulse, including amplitude and wavelength, using a pressure sensor proximate to the valve;
   measuring a returned signature reflection of the transient hydrodynamic pressure pulse, including amplitude and wavelength, using the pressure sensor; and
   comparing, using a processor, at least one of:
      the pressure trace and the returned signature reflection to determine a change in at least one of amplitude or wavelength and comparing the change to known changes due to different types of flow barriers to determine a type of flow barrier in the wellbore; or
      the returned signature reflection to a known signature reflection of a transient hydrodynamic pressure pulse reflecting off a flow barrier of a known condition to determine a condition of the flow barrier.

2. The method of claim 1, further comprising determining the condition of the flow barrier comprising a cured fluidic plugging material.

3. The method of claim 2, wherein the flow barrier comprises cement and determining a condition of a flow barrier comprising a cured fluidic plugging material comprises determining if the cement has cured.

4. The method of claim 1, further comprising comparing the pressure trace and the returned signature reflection to determine the type of flow barrier, including if the flow barrier is a liquid/liquid interface or a liquid/gas interface.

5. The method of claim 4, wherein determining if the flow barrier is a liquid/liquid interface or a liquid/gas interface further comprises determining if the flow barrier comprises more than one liquid/liquid interface or liquid/gas interface.

6. The method of claim 1, further comprising measuring a consecutive returned signature reflection and comparing at least one of the pressure trace and the returned signature reflection or the return signature reflection and the consecutive returned signature reflection to determine a depth of the flow barrier.

7. The method of claim 1, further comprising positioning the valve within the wellbore.

8. The method of claim 1, further comprising positioning the valve at the surface.

9. A method for inspecting a wellbore, the method comprising:
   inducing, by a valve, a first transient hydrodynamic pressure pulse in the wellbore;
   measuring a pressure trace of the first transient hydrodynamic pressure pulse using a pressure sensor proximate to the valve;
   measuring a returned signature reflection of the first transient hydrodynamic pressure pulse using the pressure sensor;
   inducing, by the valve, a second transient hydrodynamic pressure pulse in the wellbore;
   measuring a pressure trace of the second transient hydrodynamic pressure pulse using the pressure sensor;
   measuring a returned signature reflection of the second transient hydrodynamic pressure pulse using the pressure sensor;
   generating, using a processor, a first pressure profile based on the pressure trace of the first transient hydrodynamic pressure pulse and the returned signature reflection of the first transient hydrodynamic pressure pulse;
   generating, using the processor, a second pressure profile based on the pressure trace of the second transient hydrodynamic pressure pulse and the returned signature reflection of the second transient hydrodynamic pressure pulse; and
   comparing, using the processor, the first pressure profile and the second pressure profile to determine a stability of an isolation device in the wellbore.

10. The method of claim 9, wherein the isolation device is selectively adjustable between an open position and a closed position and the method further comprises comparing at least one of the first pressure trace or the second pressure trace or the respective returned signature reflections to determine the position of the isolation device.

11. The method of claim 9, further comprising measuring a consecutive returned signature reflection of either the first or second transient hydrodynamic pressure pulse and comparing at least one of the first pressure trace or the second pressure trace with the respective returned signature reflection or the first or second returned signature reflection with the respective consecutive returned signature reflection to determine a depth of the isolation device.

12. The method of claim 9, further comprising positioning the valve within the wellbore.

13. The method of claim 9, further comprising positioning the valve at the surface.

14. A system for inspecting a wellbore with a flow barrier, the system comprising:
   a valve configured to generate first and second transient hydrodynamic pressure pulses in the wellbore;
   a pressure sensor proximate to the valve and configured to measure pressure traces of the first and second transient hydrodynamic pressure pulses and first and second returned signature reflections of the respective first and second transient hydrodynamic pressure pulses; and
   a computer system in electronic communication with the pressure sensor and configured to:
      generate a first pressure profile based on the pressure trace of the first transient hydrodynamic pressure pulse and the first returned signature reflection; and
      generate a second pressure profile based on the pressure trace of the second transient hydrodynamic pressure pulse and the second returned signature reflection; and
   wherein the computer system is further configured to at least one of:
      compare either the first pressure trace with the first returned signature reflection or the second pressure trace with the second returned signature reflection to determine a change in at least one of amplitude or wavelength and compare the change to known changes due to different types of flow barriers to determine a type of flow barrier in the wellbore;
      compare the first or second returned signature reflection to a known signature reflection of a transient hydrodynamic pressure pulse reflecting off a flow barrier of a known condition to determine a condition of the flow barrier; or
      compare the first pressure profile and the second pressure profile to determine a stability of the flow barrier in the wellbore.

15. The system of claim 14, wherein the valve is positioned within the wellbore.

16. The system of claim 14, wherein the valve is positioned at the surface.

17. The system of claim 14, wherein the flow barrier comprises at least one of a plug or a packer.

18. The system of claim 14, wherein the flow barrier comprises a cured fluidic plugging material.

19. The system of claim 14, wherein the flow barrier comprises at least one of a liquid/liquid interface or a liquid/gas interface.

20. The system of claim 14, wherein the computer system is further configured to determine a depth of the flow barrier.

* * * * *